United States Patent
Nichols

[11] 3,728,857
[45] Apr. 24, 1973

[54] TURBO-COMPRESSOR-PUMP
[75] Inventor: Kenneth E. Nichols, Arvada, Colo.
[73] Assignee: The Gates Rubber Company, Denver, Colo.
[22] Filed: June 22, 1971
[21] Appl. No.: 155,497

[52] U.S. Cl. ................60/36, 62/402, 184/6.11
[51] Int. Cl. ..............................F01k 25/00
[58] Field of Search ............184/6.11; 165/26; 62/402; 60/36; 417/407

[56] References Cited
UNITED STATES PATENTS

| | | | |
|---|---|---|---|
| 3,133,425 | 5/1964 | Hanny et al. | 62/402 X |
| 3,292,366 | 12/1966 | Rice et al. | 60/36 |
| 3,105,631 | 10/1963 | Hanny | 417/407 |
| 3,568,438 | 3/1971 | Meienberg | 60/36 |

Primary Examiner—Manuel A. Antonakas
Attorney—Raymond Fink et al.

[57] ABSTRACT

A turbo-compressor-pump unit utilizing a common working fluid in the turbine, compressor, pump, and as lubricant. A dynamic sealing and bearing means maintains separation of the working fluid at different energy or pressure levels within the turbo-compressor-pump unit.

17 Claims, 5 Drawing Figures

INVENTOR
KENNETH E. NICHOLS
BY H. H. Oberg Jr
ATTORNEY 3,728,857

TURBO-COMPRESSOR-PUMP

BACKGROUND OF THE INVENTION

The invention relates to turbine power plants, but more particularly the invention relates to turbine powered pumps or compressors, adapted for use with Rankine cycle power systems.

The advantages of using a Rankine cycle system as a means of converting heat energy to work is well recognized. For example, a Rankine cycle system may be used to power a refrigeration system. In such systems, it is also recognized as being advantageous to use a common working fluid for the power and refrigeration "loops." For thermodynamic reasons, it is desirable to use a working fluid exhibiting high pressure differentials at relatively low temperatures in light weight and low power engine applications. Such working fluids include the halogenated hydrocarbons. Examples of such power systems include U.S. Pat. No. 3,259,176 as issued to Rice et al., and U.S. Pat. No. 3,479,817 as issued to Minto.

While the use of a Rankine cycle system in low power applications is highly desirable, the use thereof invites sealing and lubrication problems. As previously mentioned, the desirable working fluid must exhibit high differential pressures at moderate temperatures. Or in other words, the fluids typically have high vapor pressures, near ambient conditions, coupled with low viscosities. The fluid characteristics make them susceptible to leakage past even the best type wiping seals. Too much fluid loss results in failure of the power system. Replacement of the working fluid is both time consuming and uneconomical.

Lubrication presents another problem. All rotating machinery of the power system must be properly lubricated. Some systems mix an oil with the working fluid to effect lubrication. The oil affects the heat transfer characteristics of the heat exchangers used in the system. Other systems have elaborate means to prevent oil from mixing with the working fluid. Inadvertent oil mixing may also degrade the working fluid to a point that seriously affects thermodynamic efficiency.

SUMMARY OF THE INVENTION

In accordance with the invention, a turbo-compressor-pump is provided having internal flow control or sealing means whereby the same working fluid is used in the turbine, pump, compressor, and as lubricant. A rotative shaft has a turbine wheel attached at one end thereof and a compressor wheel attached at the opposite end. A fluid pump is also attached to the shaft. A housing, including appropriate diffusers, inducers, passageways and shroudes, mounts and receives the rotative shaft and the component parts attached thereto. A bearing, retained or mounted by the housing, supports the rotative shaft near each end thereof. A flange having oppositely facing surfaces projects in a radial manner from the shaft adjacent each bearing. One side of each flange provides a thrust surface for the bearing adjacent thereto. The opposite side of each flange defines a pumping means having a fluid pressure rise capability responsive to rotation of the shaft. The pressure of the working fluid exiting the bearings is less than that of pumping means defined on the flanges. All components mounted to or from the shaft are fluidly communicable via housing-shaft clearances, and passageways. Thus the same working fluid is exposed to all components on the shaft. Rotation of the shaft activates the pumping means and bearings to effect separation of the working fluid at various pressures and conditions between components mounted to the shaft.

Accordingly, it is an object of the invention to provide a turbo-compressor-pump unit that utilizes a common working fluid for all rotative components.

Another object of the invention is to provide a turbo-compressor or pump unit which uses a common working fluid for expansion, compression, pressurization and lubrication and where the common fluid is dynamically separated by fluid control means contained within the unit.

A further object of the invention is to provide a hermetically sealable turbo-compressor or pump unit which is free of wiping seals.

Still another object of the invention is to provide a hermetically sealed Rankine cycle power plant which may be used in combination with a hermetically sealed refrigeration system, together operable with the same working fluid.

An advantage of the invention is that the turbine working fluid is also used as the lubricant for the bearings supporting the turbine shaft. No lubricating oils are used or required.

These and other objects or advantages of the invention will become more apparent by reviewing the drawings and description thereof wherein.

DESCRIPTION OF PREFERRED EMBODIMENT

Figures 1, 2:
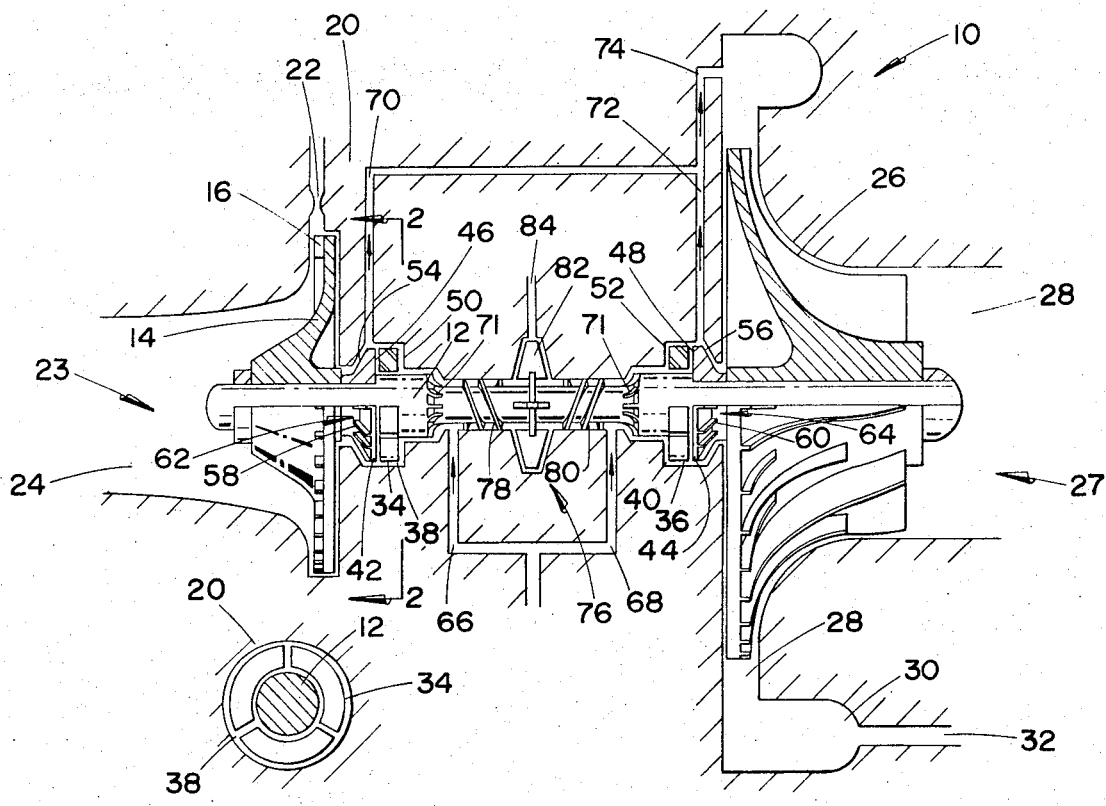
FIG. 1 is a partial cross-sectional view of a turbo-compressor-pump of the invention.
FIG. 2 is a view taken along the line 2—2 of FIG. 1.

Referring to FIGS. 1 and 2, a turbo-compressor-pump unit 10 is provided in accordance with the invention. At one end of a rotative shaft 12 is mounted a radial inflow turbine wheel 14 of known configuration. A plurality of cantilevered turbine blades 16 project from the periphery of one side or face of the turbine wheel 14. An axial flow turbine may be used but the radial inflow type is preferred as it simplifies plumbing and manufacturing problems. The turbine wheel is disposed within a housing 20. A portion of the housing mounts, retains, or defines at least one nozzle 22 for directing a compressed gaseous working fluid to power the turbine. The housing 20 shrouds the turbine wheel 14 to define a turbine 23 have a turbine exhaust 24 for directing expanded gaseous working fluid away from the turbine.

The opposite or second end of the shaft mounts a centrifugal compressor wheel 26 of known configuration. Here, the centrifugal compressor with its radially outward flow characteristics is preferred over an axial flow compressor because of plumbing simplification. A portion of the housing 20 shrouds the compressor wheel 26 and defines: a compressor 27 having an inlet 28 for directing low pressure gaseous working fluid to the compressor wheel 26; a diffuser 28 and volute 30 for collecting compressed gaseous working fluid from the compressor wheel; and a compressor exhaust 32 for directing compressed gaseous working fluid away from the unit. The working faces of the turbine 14 and compressor 26 wheels face opposite and away from each other to facilitate interconnecting plumbing therebetween in a manner which will later be explained.

The rotative shaft 12 is preferably supported near each end portion thereof by a floating slipper bearing 34, 36. Cups or retainers 38, 40 are formed within or retained by the housing 20 for mounting and retaining the bearings 34, 36. Other bearings such as tilting pad bearings, may be used. Bearings of the floating slipper type are preferred as they compensate and tolerate for some shaft and component unbalance. The sealing means of the invention includes a flange 42, 44 or collar extending from the shaft 12 adjacent to one radial side of each floating slipper bearing 34, 36. One side of each flange defines a face 46, 48 for transmitting or receiving thrust. The housing 20 forms similar faces 50, 52 adjacent the opposite side of the bearing for receiving or transmitting end thrust through the floating slipper bearings in known fashion. The two flanges are oppositely facing, as are the housing faces, to accommodate thrust loads in each direction; and to retain the shaft within the housing. Preferably, the thrust surfaces 46, 48 face toward each other as shown to simplify housing construction. On the second or oppositely facing face of each flange is formed a pump impeller 54, 56. The impellers 54, 56 may have any desired shape to provide a desired pumping efficiency or pressure ratio. For example, the second flange face may be: similar to the thrust face; generally frustro-conical; or include vanes 58, 60. The housing 20 shrouds each pump impeller 54, 56. Together, the housing and impellers define two oppositely facing pumping means 62, 64, the significance of which will later become apparent.

The housing 20 has or mounts passageways or conduits for directing liquid working fluid to and from each bearing. The passageways may be separate conduits or included within the housing. Bearing feed passageways 66, 68 direct the working fluid to the inside diameters of the bearings 34, 36 while bearing return passageways 70, 72 directs working fluid away from the outside diameter of the bearings. In the embodiment shown, working fluid is directed to the shaft 12. An annular clearance between the shaft and housing receives the working fluid and directs it to the bearings. It is, of course, understood that the bearing feed passageways 66, 68 may directly lead to the bearing 34, 36 inside diameters. The annular clearance may be considered as an extension of the bearing feed passageways. Optionally, secondary pumping means 71 may be provided on the shaft for raising the pressure of the working fluid feeding the bearings. The secondary pumping means 71 may be a step in the shaft or include vanes. Where bearings other than that of the floating slipper type are use, the secondary pumping means 71 may have to be included to effect separation of the working fluid within the housing in a manner which will be later explained. As the shaft rotates, the secondary pumping means raises the pressure of that portion of working fluid directed to the bearings.

The bearing return passageways 70, 72 direct working fluid away from the bearings. The restriction of the return passageways 70, 72 are of primary importance as they pertain to the lubricating and working fluid separation aspects of the invention. The passageways have pre-determined restriction to inhibit working fluid flow through the bearings. The return passageways are directed to a working fluid low pressure area. For example, the passageways 70, 72 may be manifolded 74 to optionally lead to a location by either the turbine wheel or compressor wheel, or other lower pressure area. Although the passageways 70, 72 may be directed to locations near the turbine, or compressor, care must be exercised in choosing the location to avoid seriously affecting the operating characteristics of the turbine or compressor.

Also provided on and extending from the shaft is a feed pump 76 for supplying high pressure working fluid. The pump is of a special design which precludes cavitation at high rotational speeds (e.g., 20,000 to 50,000 rpm) as induced by the turbine. The pump 76 requires less net-positive-suction-head (NPSH) than conventional two stage pumps. The pump has two stages. Two first stage elements supply working fluid to a single second stage impeller. The two first stage elements include two oppositely spiraled inducers 78, 80 as upraised vanes extending from the shaft 12. The two first stage inducers 78, 80 operate to converge and supply working fluid to the single, second-stage impeller. If only one first stage inducer were provided, net-positive-suction head to the pump may have to be increased as much as 40 percent. The second stage impeller includes a plurality of vanes 82 radially mounted to or extending from the shaft 12. Working fluid flowing to the pump 76 is split with the bearing feed passageways 66, 68. The housing defines a pump discharge passageway 84 for directing pressurized working fluid away from the pump.

The housing 20 has heretofore been defined as having characteristics or configurations that are complementary to the turbine, compressor, pump and seals. The housing may consist of a number of direct or separate parts as desired which are fastened or joined together with appropriate fasteners and fittings. In any desired configuration, the housing completely and appropriately shrouds the shaft and the components mounted thereon. The turbine, bearings, pumps, and compressor are fluidly communicable with each other, under static conditions, through the clearances of the housing. No shaft wiping seals or static seals are provided or are necessary. There is no dynamic seal between any of the rotative parts and atomsphere. Thus, the unit as provided is hermetically sealable when the passageways, conduits, and openings of the housing are connected with other component parts of a thermodynamic system such as a Rankine cycle power plant and refrigeration system.

Here it should be noted with emphasis and particularity that a common working fluid is used for the turbine, pumps, compressor, and lubricant. Examples of working fluids capable of performing all functions include the halogenated hydrocarbons such as trichloromonofluoromethane, dichlorodifluoromethane, chlorodifluoromethane, dichlorotetrafluoroethane, carbon tetrachloride, tricholorotrifluorethane, or mixtures thereof. The working fluid may completely fill all voids or cavities of the unit. Hence, the static pressure throughout the unit is constant; for example, the pressure may be 8 psia when the turbine is not rotating. Activation of the unit results in the working fluid being separated in a controlled manner into different pressure or energy levels between the turbine, pumps, and compressor. The separation of the working fluid may best be understood when the unit is installed to operate with a refrigeration system.

Figure 3:
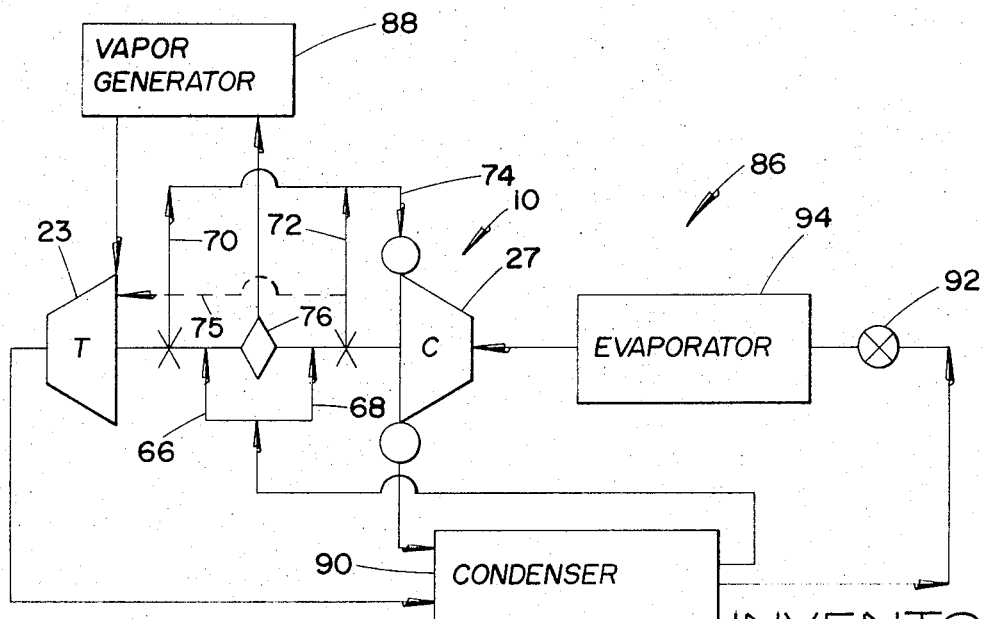
FIG. 3 is a schematic showing the turbo-compressor pump of the invention installed in a Rankine cycle system that powers a refrigeration system.

Referring now to FIGS. 1 and 3, the unit 10 is shown schematically installed with a closed loop refrigeration system. All plumbing connections to the unit 10 are hermetic. Placement of the feed pump 76 within the housing and on the same shaft as the turbine 23 permits the feed pump to also be hermetically sealed.

The main system components other than the unit of the invention, include: a boiler or vapor generator 88 for vaporizing and heating working fluid, such as a fluorocarbon; a condenser 90 for liquifying pressurized working fluid; expansion means 92 for controllably reducing the pressure of the working fluid; and an evaporator 94 for vaporizing the low pressure liquid working fluid and effecting refrigeration. The unit 10 is hermetically connected in the system 86 with appropriate plumbing. For the purpose of illustration, let it be assumed that the components have generally the following steady state operating pressures and working fluid phases: vapor generator, 335 psia, vapor; condenser, 20 psia, saturated liquid; and evaporator, 3 psia, vapor.

When the turbine 26 is activated by supplying pressurized gaseous working fluid to the turbine nozzle 22, for example, gas from the boiler 88 at 335 psia, the shaft 12 rotates. The gas expands to a lower pressure as it passes through the turbine 23. For example, the gas is expanded to a pressure near that of the condenser, or 20 psia. During start-up, any liquid near the turbine wheel 14 or exhaust 24 is dispelled to the condenser 90. Pressure behind the turbine wheel will be slightly higher than the turbine exhaust pressure; for example, the pressure may be 25 psia.

Rotation of the shaft 12 activates the compressor 27. Any liquid in the area of the compressor is pumped and dispelled through the compressor exhaust 32 as the compressor strives to compress a gaseous working fluid from the evaporator 94. The compressor 27 compresses the gaseous working fluid and raises the pressure thereof from the 3 psia of the evaporator 94 to slightly higher than the 20 psia of the condenser 90.

Simultaneously as the shaft is rotated, liquified working fluid flows from the condenser 90 at 20 psia and enters the combination bearing and pump feed passageways 66, 68 where the flow is split. A portion of fluid flowing through the passageways is directed to the secondary pumping means 70 where pressure is increased before the fluid enters the inside diameter of the bearings 34, 36. Pressure may be increased from 20 psia to 40 psia, for example. Working fluid then enters the bearings 34, 36 at 40 psia and exits the bearings at 60 psia when the shaft reaches nominal speed. Working fluid pressure increases as it flows through the bearing because the rotational motion of the shaft and flanges induces the individual pads of the slipper bearings 34, 36 to rotate at a fractional speed of the shaft and increase the working fluid pressure level. Working fluid exits the bearing through the bearing return passageways 70, 72 and manifolded 74 into the volute collector 30 of the compressor. The bearing return passageways 70, 72 may optionally be manifolded 75 to the turbine 23. Simultaneously working fluid pressure increases in the oppositely facing pumping means 62, 64. As there is no liquid working fluid feeding the inlet side of the oppositely facing pumping means from either the compressor or turbine side, a free liquid surface is generated which moves radially outward along the face of each pump impeller 54,56. When the pump means adjacent each bearing is initially full of lubricant, each pumping means may have a design pressure rise near 135 psia, which results in an exit pressure of 160 psia. As the free liquid surface of working fluid moves up the face of each pump impeller 54, 56, the exit pressure of each pumping means 62, 64 is correspondingly reduced. Movement of the free liquid surface along each impeller stops when the exit pressure of each pumping means just equals the exit pressure of the working fluid from the bearings. That is when all four pressures (two bearings 34, 36 and two pumping means 62, 64) are 60 psia. Should the lubricant pressures from the bearings increase, the free liquid surface moves radially inward to a point where a pressure balance is achieved. Thus, it is seen that the pumping means adjacent the turbine may seal at a different pressure from that of the pumping means adjacent the compressor. In the instant example, the bearing exit pressures could reach 160 psia and a dynamic seal would still be maintained.

That working fluid flowing through the bearing feed passageways that does not flow to the bearings, flows to the two first stage inducer sections 78, 80 of the feed pump 76. The two inducer sections 78, 80 raise the pressure of the working fluid an amount to prevent cavitation of the second stage of the pump. For example, the inducer stage may raise the pressure from 20 psia to 40 psia. The two first stage inducer sections permit the second stage of the pump to operate at high rotational speeds without cavitating. The second or main stage 82 of the pump raises the pressure of the working fluid to a pressure level near that of the boiler, or 335 psia, the working fluid is then discharged from the pump 76 to the boiler 88.

The foregoing example is illustrative of the many advantages of the invention. Summarly, the same working fluid is used for the turbine, compressor and lubricant. By using the working fluid as a lubricant, the need for static or wiping seals is eliminated. It is unnecessary to provide a lubricant separate from or carried along with the working fluid. As the feed pump is mounted to the same shaft as the turbine, no separate prime mover or sealing or lubrication arrangement is needed for the pump.

ADDITIONAL SPECIES

Figure 4:
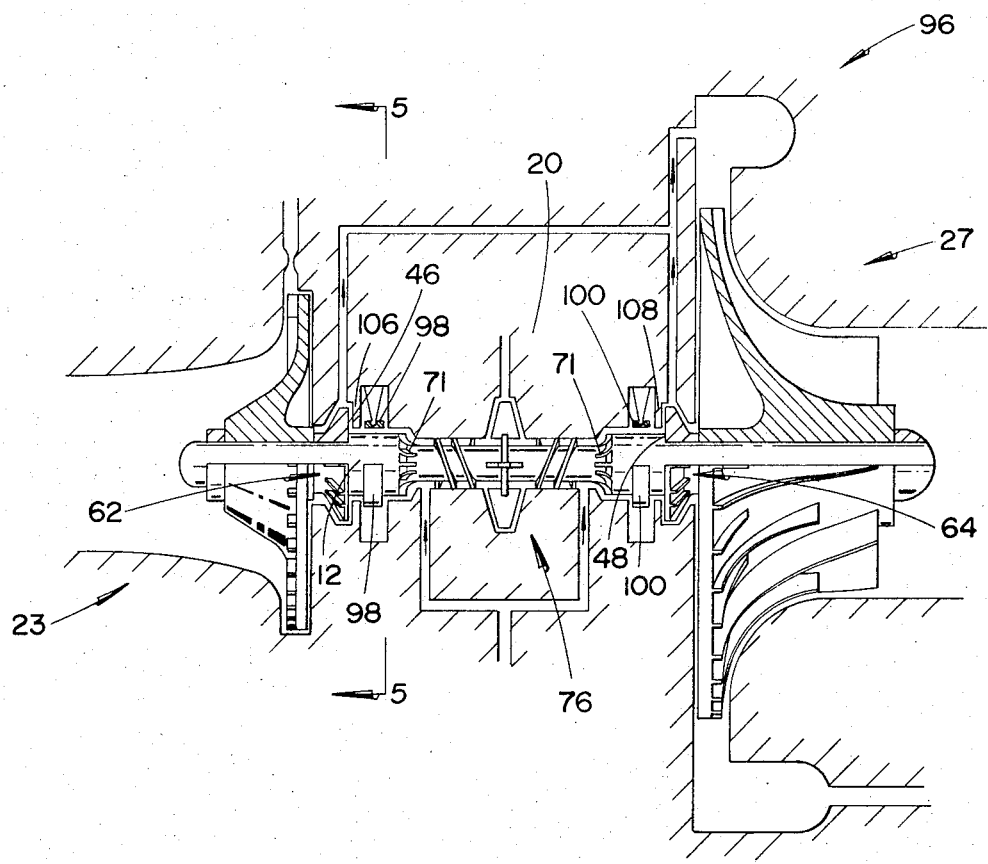
FIG. 4 is a view similar to FIG. 1 but showing an alternate form of the invention.
Figure 5:
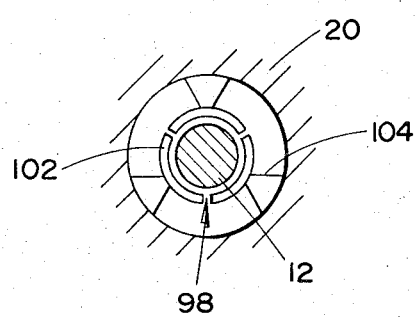
FIG. 5 is a view taken along the line 5—5 of FIG. 4.

The foregoing embodiment uses floating slipper bearings to support the rotative shaft. Floating slipper bearings are preferred as they tolerate and adjust for a dynamic unbalance of the rotative elements which would be untolerable for other types of bearings. However, floating slipper bearings are not required to realize the benefits of the invention as other bearings may be used while still maintaining separation and control of the working fluid under dynamic conditions. Referring now to FIGS. 4 and 5, a turbo-compressor-pump unit 96 similar to that of FIGS. 1 and 2 is shown. The elements of the unit are the same except for the bearing system. The rotative shaft 12 is radially supported by two tilting pad bearings 98, 100, each bearing including a plurality of individual pads 102 encircling the shaft and pivotally 104 supported from the housing 20. The bearings radially support the shaft in known fashion. A thrust collar or ring 106, 108 extends radially inward from the housing 20 adjacent the thrust face 46, 48 of each flange extending from the shaft. A spiral groove, not shown, in either the thrust washer or flange may be provided to channel a sufficient amount of working fluid for lubrication. As the tilting pad bearings do not perform a pumping action like the floating slipper bearings, the pressure rise capability of the secondary pumping means 71 may have to be increased, or that of the pumping means 62 64 decreased, to effect desired dynamic sealing. For example, the pressure rise capability of the secondary pumping 70 means may be increased from 40 psia to 60 psia. Sealing and separation of the working fluid within the unit is then the same as previously explained.

The foregoing detailed description is made for purpose of illustration only and is not intended to limit the scope of the invention which is to be determined from the appended claims.

What is claimed is:

1. In a turbo-compressor unit of the type operative with a vaporized working fluid and having a turbine and compressor wheel mounted to a mutual rotative shaft that is supported by a first bearing near the turbine wheel and a second bearing near the compressor wheel and where the shaft, turbine wheel, compressor wheel and bearings are mounted within a housing, the improvement which comprises:

a first passageway disposed within the housing, and directed to each bearing, said first passageway capable of supplying liquid working fluid past each bearing at a pressure;

a first pumping means disposed within the housing between the first bearing and turbine for pressurizing working fluid to a pressure just equal to the pressure of the working fluid past the first bearing from said first passageway, said first pumping means responsive to rotation of the shaft and having a pump inlet and outlet, the pump inlet being fluidly communicable with the turbine and the pump outlet being fluidly communicable with said first passageway past the first bearing;

a second pumping means disposed within the housing between the second bearing and compressor for pressurizing working fluid to a pressure just equal to the pressure of the working fluid past the second bearing from said first passageway, said second pumping means responsive to rotation of the shaft and having a pump inlet and outlet, the pump inlet being fluidly communicable with the compressor and the pump outlet being fluidly communicable with said first passageway past the second bearing; and a second passageway disposed within the housing and directed from the outlet of said first and second pumping means for channeling working fluid from said first passageway, first and second bearings, and first and second pumping means, said second passageway having a pre-determined restriction for limiting working fluid flow therethrough.

2. A turbo-compressor unit as set forth in claim 1 and further including:

a third pumping means disposed within the housing and mounted to the rotative shaft for pressurizing working fluid to the bearings in response to rotation of the shaft, said third pumping means having a pump inlet and outlet manifolded in series with said first passageway.

3. A turbo-compressor as set forth in claim 1 and further including:

a fourth pumping means disposed within the housing and mounted to the rotative shaft for supplying pressurized working fluid external of the turbo compressor unit, said fourth pumping means having a pump inlet manifolded to said first passageway.

4. A turbo-compressor as set forth in claim 3 wherein said fourth pumping means comprises:

a first stage inducer section including two oppositely spiraled vanes projecting from the shaft at a location between the bearings, said first stage inducer section manifolded to said first passageway; and a second stage impeller mounted to said shaft between the two oppositely spiraled vanes, said second stage impeller including a plurality of vanes projecting generally radially from the shaft.

5. In a turbo-compressor unit of the type operative with a vaporized working fluid and having a turbine and compressor wheel mounted to a mutual rotative shaft that is supported by a first bearing near the turbine wheel and a second bearing near the compressor wheel, and where all of which are disposed and mounted within a housing, a method of lubricating the bearings with the same working fluid while simultaneously dynamically separating the working fluid between the turbine, compressor and bearings, comprising the steps of:

flowing liquified working fluid under pressure past the bearings;

balancing the pressure of the liquified working fluid from the first bearing against the discharge pressure of a first pumping means responsive to rotation of the shaft and disposed between the first bearing and turbine wheel, the first pumping means having a pressure rise capability greater than the pressure of the liquified working fluid flowing from the first bearing;

simultaneously balancing the pressure of the liquified working fluid from the second bearing against the discharge pressure of a second pumping means responsive to rotation of the shaft and disposed between the second bearing and compressor wheel, the second pumping means having a pressure rise capability greater than the pressure of the liquified working fluid flowing from the second bearing;

manifolding the inlet of the first pumping means to the turbine, while simultaneously manifolding the inlet of the second pumping means to the compressor; and draining the combined flow of liquified working fluid from the first pumping means and bearing, and the second pumping means and bearing through at least one restriction of pre-determined resistance.

6. The method as set forth in claim 5 and further including the step of:

manifolding the liquified working fluid flow from the bearings to the compressor.

7. The method as set forth in claim 5 and further including the step of:

manifolding the liquified working fluid flow from the bearings to the turbine. 8. The method as set forth in claim 5 wherein the liquified fluid flowing to the bearings is pressurized by a pumping means responsive to rotation of the shaft.

9. A hermetically sealable turbo-compressor-pump for use with a mutual working fluid, comprising;

a rotative shaft having first and second end portions;

a turbine wheel mounted to and near one end portion of said shaft;

a compressor wheel mounted to and near the opposite end portion of said shaft;

a first flange extending from said shaft near said turbine wheel, said first flange having oppositely facing first and second faces, the face nearest said turbine wheel defining a pump impeller and the other face defining a thrust surface;

a second flange extending from said shaft near said compressor wheel, said second flange having oppositely facing first and second faces, the face nearest said compressor defining a pump impeller and the other face defining a thrust surface;

bearing means near the thrust surface of the first and second flanges for supporting said shaft, said bearing means having inside and outside diameters;

a housing having a bore that receives said shaft and having retainers for receiving said bearing means; said housing: shrouding said turbine wheel to define a turbine, shrouding said compressor wheel to define a compressor, and shrouding the pump impeller faces of said first and second flanges to define first and second pumping means which individually have a desired pressure rise capability;

a third pumping means extending from said shaft and disposed within said housing for pressurizing a portion of working fluid, said third pumping means fluidly communicable with and having a pressure rise capability less than the pressure rise capability of said first and second pumping means, said third pumping means capable of pumping a portion of working fluid to near the inside diameter of said bearing means;

a first fluid passageway directed to said third pumping means; and a second and third fluid passageway directed from said first and second pumping means, said second and third passageways having predetermined restriction for limiting flow of working fluid through the bearings.

10. A turbo-compressor-pump as set forth in claim 9 and further including a high speed pump disposed within said housing and mounted to said shaft, said high speed pump comprising:

a second stage impeller including a plurality of vanes projecting radially away from said shafts; and a first stage inducer including a first and second oppositely spiraled vanes projecting in a helical manner away from said shaft, said first and second spiraled vanes sandwiching said second stage impeller therebetween.

11. A turbo-compressor-pump as set forth in claim 9 and further including a fourth passageway that manifolds and connects said second and third passageways with said compressor.

12. A turbo-compressor as set forth in claim 9 and further including a fourth passageway that manifolds and fluidly connects said second and third passageways with said turbine.

13. A turbo-compressor as set forth in claim 9 wherein said bearing means are floating slipper bearings capable of pumping in response to rotation of said shaft to define a pressure rise capability, and wherein the combined pressure rise capability of said bearings and said third pumping means is less than the pressure rise capability of said first and second pumping means.

14. In a turbo-compressor unit of the type operative with a single vaporized working fluid and having a turbine driving a compressor with a common shaft that is supported a first bearing near the turbine and a second bearing near the compressor and having a common housing, the improvement which comprises:

means for flowing a portion of the same working fluid in liquified form under pressure to and past the bearings to lubricate the bearings;

means for restricting the liquified working fluid flowing as a lubricant from the bearings;

means for separating within the housing the vaporized working fluid of the turbine and compressor from the fluid flowing past the bearings; and means for directing the liquid working fluid flowing past the bearings to the vaporized working fluid of the turbo-compressor unit;

whereby a mutual working fluid is used for lubricating the bearings and in operating the turbine and compressor.

15. A refrigeration system for cooling of the type having a vapor generator containing a working fluid, means for adding heat to the vapor generator to vaporize said liquid, a turbine, means for conducting gas from the vapor generator to the turbine, a compressor driven by the turbine through a mutual shaft, a condenser for receiving and liquifying the vaporized working fluid from the turbine and compressor, expansion means for receiving and controllably decreasing the pressure of the working fluid from the outlet of the condenser, an evaporator for receiving and vaporizing the discharge of liquified working fluid from the expansion means, wherein the improvement comprises:

a mutual housing shrouding and mounting the turbine, compressor and mutual shaft;

a pump disposed within the housing and mounted to the shaft, said pump receiving liquified working fluid from the condenser and discharging pressurized working fluid into the vapor generator;

bearing means operative with liquified working fluid from the condenser for rotatively supporting the shaft, means for channeling a portion of the same working fluid in liquid form to and from the bearing means;

means for separating, within the housing, the vaporized working fluid of the turbine and compressor from the liquified working fluid of said pump and bearings; and means for directing the liquid working fluid flowing past the bearings to vaporized working fluid contained within the housing;

whereby a hermetically sealed refrigeration system is provided.

16. In a turbo-compressor unit of the type operative with a single vaporized working fluid and having a turbine driving a compressor with a common shaft that is supported by a first bearing near the turbine and a second bearing near the compressor and having a common housing, the improvement which comprises:

means for flowing liquified working fluid under pressure to and past the bearings to lubricate the bearings;

means for restricting the liquified working fluid flowing as a lubricant from the bearings; and means for separating within the housing the vaporized working fluid of the turbine and compressor and the fluid flowing past the bearings, said separating means including a first pumping means disposed within the housing between the first bearing and turbine for pressurizing liquified working fluid to a pressure equal to the pressure past the first bearing from said flowing means, said first pumping means responsive to rotation of the shaft and having a pump inlet and outlet, the pump inlet being fluidly communicable with the turbine and the pump outlet being fluidly communicable with said restricting means; and a second pumping means disposed within the housing between the second bearing and compressor for pressurizing liquified working fluid to a pressure equal to the pressure past the second bearing from said flowing means, said second pumping means responsive to rotation of the shaft and having a pump inlet and outlet, the pump inlet being fluidly communicable with the compressor and the pump outlet being fluidly communicable with said restricting means;

whereby a mutual working fluid is used for lubricating the bearings and in operating the turbine and compressor.

17. A refrigeration system for cooling of the type having a vapor generator containing a working fluid, means for adding heat to the vapor generator to vaporize said liquid, a turbine, means for conducting gas from the vapor generator to the turbine, a compressor driven by the turbine through a mutual shaft, a condenser for receiving and liquifying the vaporized working fluid from the turbine and compressor, expansion means for receiving and controllably decreasing the pressure of the working fluid from the outlet of the condenser, an evaporator for receiving and vaporizing the discharge of liquified working fluid from the expansion means, wherein the improvement comprises:

a mutual housing shrouding and mounting the turbine compressor and mutual shaft;

a pump disposed within the housing and mounted to the shaft, said pump receiving liquified working fluid from the condenser and discharging pressurized working fluid into the vapor generator;

bearing means operative with liquified working fluid from the condenser for rotatively supporting the shaft, said bearing means including a first bearing located near the turbine and a second bearing located near the compressor;

means for channeling liquified working fluid to and from the bearing means;

means for separating, within the housing, the vaporized working fluid of the turbine and compressor from the liquified working fluid of said pump and said bearings, said separating means including:

means for restricting flow of liquified working fluid from;

a first pumping means disposed within the housing between the first bearing and turbine for pressurizing liquified working fluid to a pressure equal to the liquified, working fluid at the first bearing, said first pumping means responsive to rotation of the shaft and having a pump inlet and outlet, the pump inlet being fluidly communicable with the turbine and the pump outlet being fluidly communicable with the channeling means of the bearing; and a second pumping means disposed within the housing between the second bearing and compressor for pressurizing liquified working fluid to a pressure equal to the liquified working fluid at the second bearing, said second pumping means responsive to rotation of the shaft and having a pump inlet and outlet, the pump inlet being fluidly communicable with the compressor and the pump outlet being fluidly communicable with the channeling means of the bearing;

whereby a hermetically sealed refrigeration system is provided.

* * * * *